(12) United States Patent
Ohsawa (10) Patent No.: US 6,831,960 B2
(45) Date of Patent: Dec. 14, 2004

(54) RECEIVER FOR DIGITAL BROADCASTING

(75) Inventor: Susumu Ohsawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 764 days.

(21) Appl. No.: 09/859,578

(22) Filed: May 18, 2001

(65) Prior Publication Data

US 2002/0001357 A1 Jan. 3, 2002

(30) Foreign Application Priority Data

May 23, 2000 (JP) ........................................ 2000-151042

(51) Int. Cl.[7] ............................................... H04L 7/04
(52) U.S. Cl. ...................... 375/357; 375/362; 370/512; 348/500; 455/3.02
(58) Field of Search ................................ 375/354, 357, 375/362, 369; 370/503, 509, 512; 348/726, 500, 551; 455/3.02

(56) References Cited

U.S. PATENT DOCUMENTS 5,852,612 A * 12/1998 Kostreski et al. ........... 370/537
6,055,021 A *  4/2000 Twitchell .................... 348/513

* cited by examiner

Primary Examiner—Amanda T. Le
(74) Attorney, Agent, or Firm—Morgan, Lewis & Bockius LLP (57) ABSTRACT

Detection of synchronization signals of digital broadcasting waves of respective reception systems is periodically carried out, and a relative time difference between synchronization timings of the synchronization signals is grasped. In the case where a synchronization signal can not be detected from the reception system under selection, the relative value is added to or subtracted from the generation timing of a synchronization signal of the other reception system, so that the synchronization timing that could not be detected is presumed.

36 Claims, 6 Drawing Sheets

025
RECEIVER FOR DIGITAL BROADCASTING

This application claims the benefit of Japanese Patent Application No. 2000-151042, filed on May 23, 2000, which is hereby incorporated by reference.

BACKGROUND OF THE INVENTION

1. Field of the Invention

The present invention relates to a receiver for digital broadcasting, and more particularly, to a receiver that receives a plurality of digital broadcasting waves. Each of the digital broadcast waves is in frame transmission format that includes a synchronization signal and an information data signal. The receiver selects one of the broadcasted waves for reproducing and outputting the signal carried by the selected wave.

2. Description of the Related Art

In digital broadcasting, a frame structure has been adopted as a transmission format to transmit data over the air. The data to be transmitted is divided into a plurality of frames, in particular, data transmission is carried out in a unit of one frame mainly composed of a synchronization signal and a data signal.

On the other hand, a receiver of a digital broadcasting signal receives the signal, demodulates the received signal, and then decodes the signal into data. At the time after decoding the signal, it is necessary for the receiver to detect the start of a frame as a transmission unit of data. In such processing, the synchronization signal of the frame is utilized by the receiver to detect the start of a frame.

However, when a receiver does not receive a synchronization signal, such as in a case of a change in a reception state, the start point of a frame cannot be specified. Without frame synchronization signal detection, the data within a frame cannot be decoded, even though all data signals in the one frame are received.

This problem is especially prevalent in a receiver within a movable body where detection of a synchronization signal becomes difficult with changes in a reception state, for example, changes caused by multi-path waves or fading. In a moving body, the state of electric wave failure within a band selected by the receiver is remarkably changed, and it is therefore difficult to maintain excellent reception and reproduction. As a result, decoding of reception data cannot be suitably carried out, and thus the operability and convenience of the receiver is remarkably degraded.

SUMMARY OF THE INVENTION

Accordingly, the present invention is directed to a receiver for digital broadcasting that substantially obviates one or more of the problems due to limitations and disadvantages of the related art.

In one aspect of the present invention, a receiver is provided for a digital broadcasting system that receives broadcasting waves of a plurality of frequency bands. When the receiver cannot detect a synchronization signal from a selected band for reproduction, the receiver can decode received data of the selected band by using a synchronization signal of a broadcasting wave in a band other than the selected band.

To achieve these and other advantages and in accordance with the purpose of the present invention, as embodied and broadly described, the receiver for digital broadcasting includes a receiver for receiving a plurality of digital broadcasting waves, wherein each wave has a transmission format made of frames that include a synchronization signal and an information data signal, and the receiver selects one of the broadcasted waves for reproduction. During this process, the respective synchronization signals included in and corresponding to the plurality of respective digital broadcasting waves are first detected. Next, respective timing signals corresponding to the respective detected synchronization signals are generated on the basis of the respective detected synchronization signals. Each of the timing signals correspond to a respective one of the plurality of digital broadcasting waves. The information data signal included in the selected digital broadcasting wave may be extracted and decoded using the timing signal that corresponds to the selected digital broadcasting wave, and the data signal reproduced and outputted. In the case where the synchronization signal cannot be detected from the selected digital broadcasting wave under reproduction, the receiver may create the timing signal corresponding to the selected digital broadcasting wave on the basis of a detected synchronization signal corresponding to at least one of the other received digital broadcasting waves.

It is to be understood that both the foregoing general description and the following detailed description are exemplary and explanatory only and are intended to provide further explanation of the invention, as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the invention, examples of which are illustrated in the accompanying drawings. Whenever possible, the same reference numbers will be used throughout the drawings to refer to the same or like parts.

Recent attention is being paid to constructing a multi-band digital broadcasting system to get rid of blind spots or to take measures against electric wave failure due to multi-path waves or the like. In this system, the same program is broadcasted by using broadcasting waves of a plurality of different bands of a frequency band. For example, one or more satellite and/or terrestrial broadcasting waves may be one of the plurality of bands.

Figure 1:
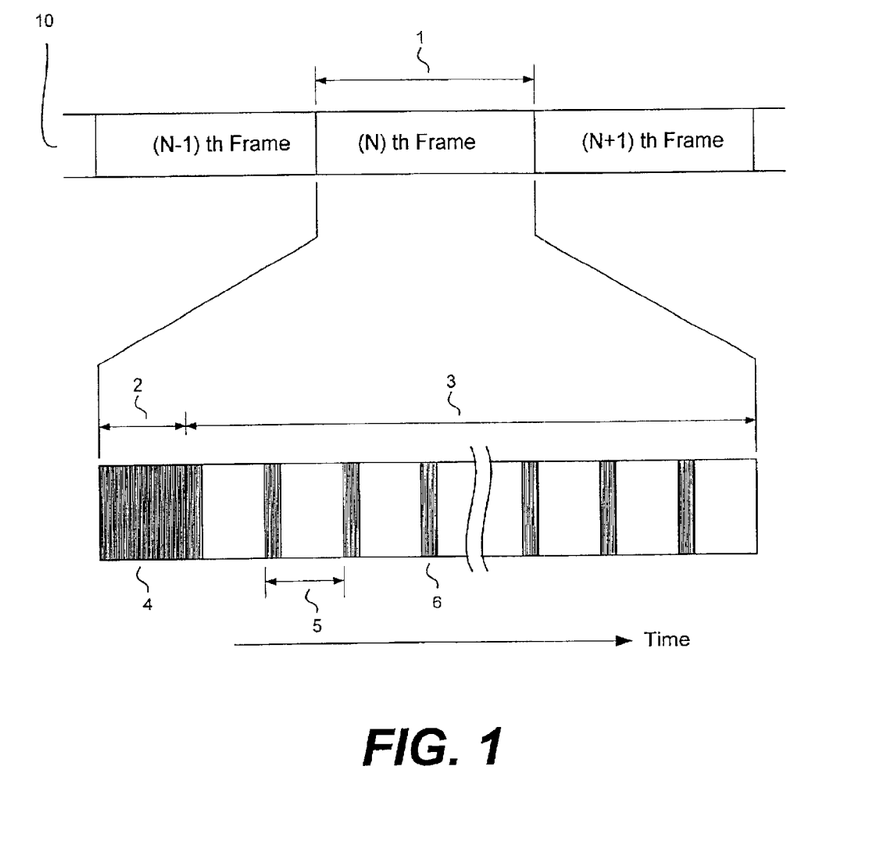
FIG. 1 shows an exemplary frame structure of a data transmission format in digital broadcasting.

FIG. 1 illustrates an exemplary transmission format 10 that has been adopted for transmitting data in digital broadcasting. Data to be transmitted is divided into a plurality of frames 1. In particular, transmission of the data is carried out in a unit of one frame 1. One frame 1 is mainly composed of a synchronization signal 2 and a data signal 3. The synchronization signal is composed of, for example, one synchronization symbol 4 indicating a start of the frame. The data signal is composed of, for example, numerous data symbols 5. Each of the data symbols 5 is such that data of a digitized picture, sound, or the like to be transmitted is subjected to digital modulation such as Orthogonal Frequency Division Multiplex (OFDM), for example.

A region provided at the head of each of the data symbols, a so-called guard interval 6, is provided to prevent interference between symbols caused by multi-path waves or the like. The guard interval is excluded from data time series after demodulation by the setting of the time window at the time of data demodulation.

On the other hand, a receiver receives the digital broadcasting signal. After demodulating a received signal, a receiver decodes this signal into data. At this time, it is necessary that the receiver detect the start of a frame as a transmission unit of data. In such processing, a synchronization signal may be used by the receiver for detecting the start of a frame.

For example, a specific pattern that does not exist in normal data signals may be determined in advance to be a synchronization signal. In the case where the receiver detects such a specific bit pattern in the demodulated data time series, the receiver recognizes the pattern as a synchronization signal, i.e., the receiver detects the start of one frame of transmission data. As an exemplary synchronization signal, a pattern in which "0's" continue, so-called null symbols, may be used. Of course, it is consistent with the present invention to use other patterns distinguishable from the transmitted data as a synchronization signal.

Figure 2:
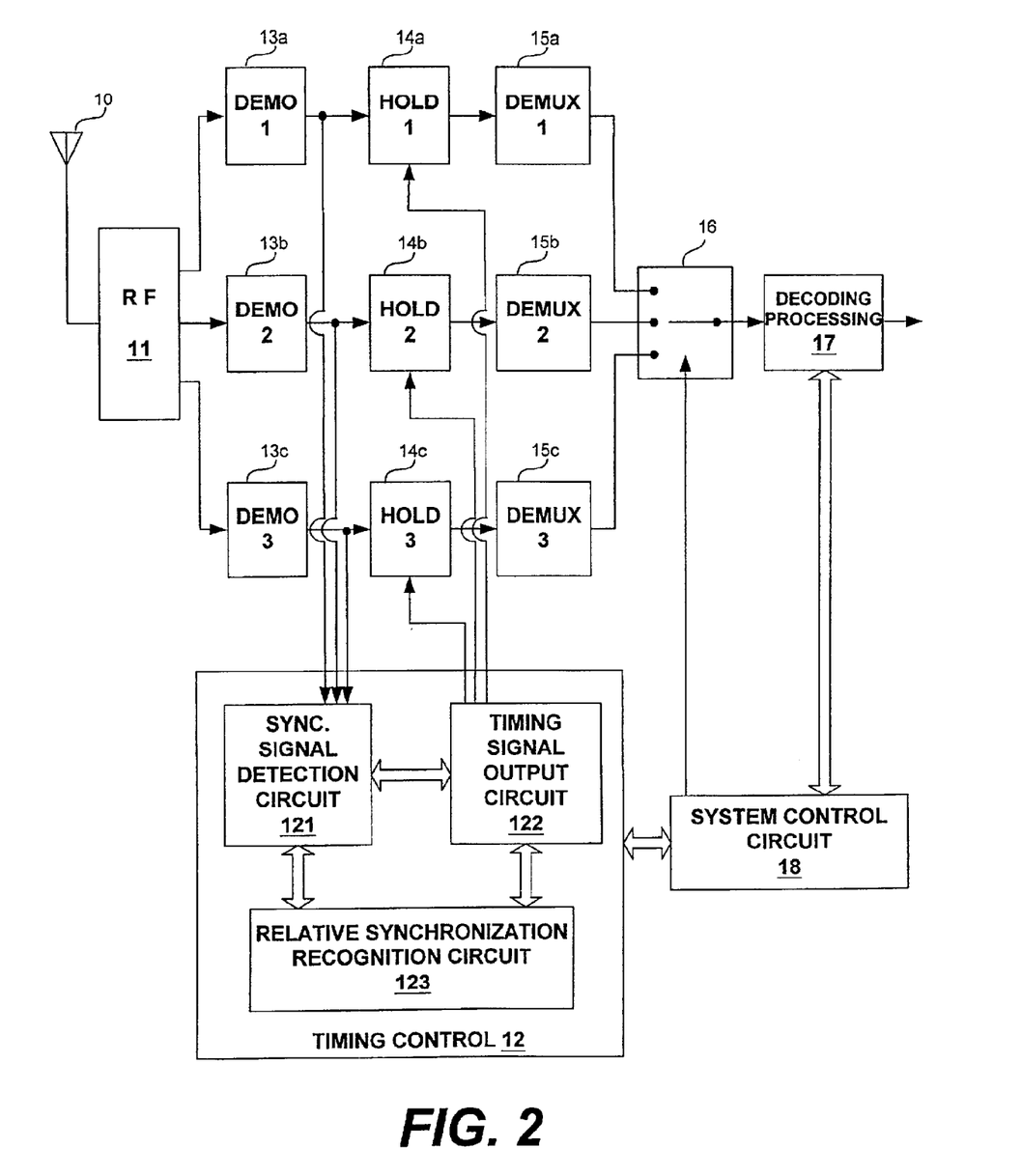
FIG. 2 provides an illustrative schematic diagram showing an exemplary structure of a receiver for digital broadcasting according to an embodiment of the present invention.

FIG. 2 is a block diagram showing an exemplary structure of a receiver for digital broadcasting according to an exemplary embodiment of the present invention. Hereinafter, as a digital broadcasting system in which the device of the present invention is used, it is assumed that programs of the same content are broadcasted by broadcasting waves of three different frequency bands. However, since the present invention relates to digital broadcasting using broadcasting waves of a plurality of bands, the present invention may use fewer or more bands than are shown in FIG. 2. It also is assumed that data to be transmitted are subjected to interleave (rearrangement of data time orders) as a countermeasure against a burst error in the middle of data transmission. The program of the same content can include a picture image, sound, character, and/or program and the like, for example, and the broadcasting wave can include ground broadcasting and/or satellite broadcasting.

In FIG. 2, an antenna 10 is constituted by a small antenna such as a rod antenna or a plane antenna, and simultaneously receives a plurality of electric waves from one or more broadcasting stations.

Processing circuit 11 processes high frequency signal(s) received through the antenna 10. Specifically, processing circuit 11 performs the role of a so-called front-end circuit in a receiver, performing functions such as amplification and frequency conversion of high frequency signals, for example.

Demodulation circuits 13a, 13b and 13c are circuits for demodulating reception signals processed through the processing circuit 11. As a modulation method of the reception signals, various methods, such as OFDM, for example, can be adopted. The demodulation circuits 13a, 13b and 13c extract time series of digital data from the reception signals by demodulation and output.

The data time series demodulated by the respective demodulation circuits 13a to 13c are held by respective reception data holding circuits 14a to 14c. Holding circuits 14a, 14b and 14c correspond to the demodulation circuits 13a, 13b and 13c, respectively. The respective demodulation circuits output data to de-interleave circuits in synchronization with respective timing signals, described below in more detail. The data that is outputted by a demodulation circuit 13a, 13b or 13c include a unit of one frame of reception data.

De-multiplexers 15a to 15c include the de-interleave circuits for de-interleaving (rearrangement of data time series) the transmitted data. This circuit returns the demodulated data time series to the original data time series (arrangement).

A changeover circuit 16 is controlled by instructions from a system control circuit 18. The changeover circuit 16 selectively outputs one of de-interleaved signals (data time series) outputted from the plurality of demultiplexers 15a, 15b and 15c, to a decoding circuit 17.

The decoding processing circuit 17 is a circuit for performing a processing such as data decoding and error correction on the basis of the de-interleaved data taken in through the changeover circuit 16. After performing such processing, the decoding processing circuit 17 outputs decoded data to an output processing circuit (not shown) of sound, picture and the like.

The system control circuit 18 may be a circuit for controlling the operation of the whole device. The system control circuit 18 may include a microcomputer and a storage element such as a ROM (Read Only Memory) and a RAM (Random Access Memory), for example. The ROM may hold programs, such as a main routine and various subroutines for controlling the operation of the device of the present invention. The RAM temporarily holds processing results of respective routines stored in the ROM.

A timing control circuit 12 mainly includes a synchronization signal detection circuit 121, a relative synchronization recognition circuit 123, and a timing signal output circuit 122. The synchronization signal detection circuit 121 detects synchronization signals included in the reception signals of the respective bands. The relative synchronization recognition circuit 123 grasps relative time differences in synchronization detection of the respective bands on the basis of the respective detected synchronization signals. The timing signal output circuit 122 supplies timing signals (hereinafter referred to as timing signals) for urging the output of the data stored in the data holding circuits 14a to 14c in synchronization with the detected synchronization signals of the respective bands or the instructions from the relative synchronization recognition circuit 123.

In operation, three digital broadcasting waves, for example, from a plurality of broadcasting stations, are supplied to the respective demodulation circuits 13a to 13c through the antenna 10 and the high frequency signal processing circuit 11. The respective reception frequency bands of the respective reception systems correspond to the respective digital broadcasting waves.

Next, signals subjected to modulation, such as OFDM modulation, for example, are demodulated by the respective demodulation circuits 13a to 13c into digital data. The signals are then supplied to the data holding circuits 14a to 14c for each of the respective reception bands. These demodulated signals are additionally supplied also to the timing control circuit 12.

Each of the data holding circuits 14a to 14c is constituted by, for example, a pair of FIFO (First-In-First-Out) type memories. The respective data holding circuits 14a to 14c store the respective demodulated data time series. At this time, the data outputted from the respective demodulation circuits 13a to 13c are stored in one of the pair of FIFO memories in the order of time of the outputted data. At the point when the demodulated data of one frame are stored in the FIFO memory, the timing control circuit 12 supplies each of the timing signals for each of the systems. By such supply of the timing signals, the storage data are outputted to the corresponding de-interleave circuits 15a to 15c. At this time, the data are outputted in the order of storage in the FIFO memories.

While outputting the reception data stored in the FIFO memory, the data holding circuit successively stores demodulated data of a next frame supplied from the demodulation circuit in the other of the pair of FIFO memories. That is, by alternately switching and using the pair of FIFO memories, the data holding circuit can simultaneously process the reception of data from the demodulation circuit and the output of held data to the corresponding de-interleave circuit.

On the other hand, the synchronization signal detection circuit 121 detects synchronization signals included in the data time series on the basis of the supplied data time series from the respective demodulation circuits 13a to 13c.

The detection of the synchronization signals can be carried out by, for example, a method as described below.

It is assumed that a bit pattern which does not occur in normal data time series is predetermined as a synchronization signal. As the pattern, for example, a series of "0's," so-called null symbols, may be used. The synchronization detection circuit 121 includes a register in which this bit pattern is set. The synchronization detection circuit 121 also includes a shift register that is structured for parallel output and has the same set bit length as the register having the set bit pattern.

The demodulated data time series are successively input into the shift register in synchronization with a clock signal. Then, each time when one bit of data is input to the shift register, all bits of the register and all bits of the shift register are compared with each other in parallel. In the case where all bits of both registers coincide, the synchronization detection circuit 121 judges that a synchronization signal is detected. The judgement result is supplied to both the timing signal output circuit 122 and the relative synchronization recognition circuit 123. The synchronization signal detection circuit 121 detects the synchronization signals of the respective reception bands individually.

Figure 3:
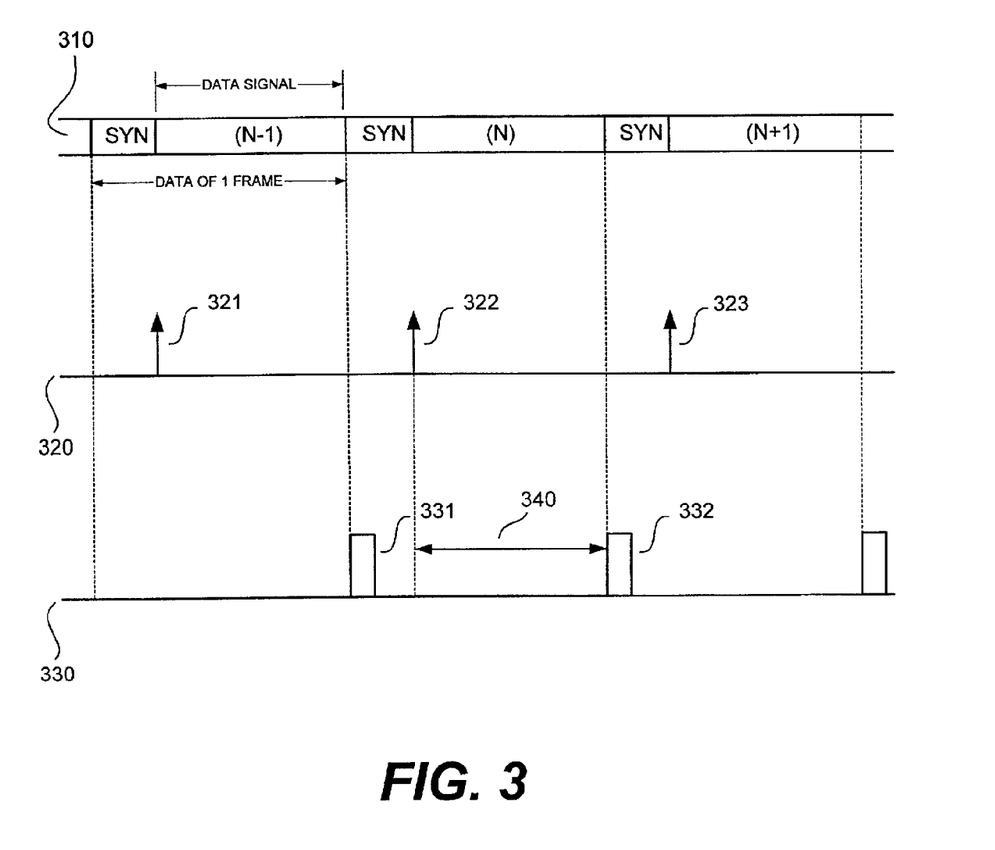
FIG. 3 is a time chart illustrative of a relation between detection of a synchronization signal included in reception data and generation of a timing signal for decoding reception data.

FIG. 3 illustrates an exemplary relation between detection of a synchronization signal SYN included in reception data and generation of a timing signal for decoding reception data of one system of the present invention. For example, one system may comprise the demodulator 13a, holding circuit 14a and demultiplexer circuit 15a (that includes de-interleave circuits) of FIG. 2. As shown in FIG. 3, each of the arrows 321, 322, 323 in the synchronization signal detection time axis 320 indicate detection of a synchronization signal SYN of the respective frames (N−1), (N), and (N+1) of transmission data 310. As the transmission data time series is output from the demodulator circuit 13a, it may be stored, for example, in the first FIFO memory of the holding circuit 14a. During the next frame of transmission data 310, i.e., frame (N), data of the previous frame (N−1) held in the first FIFO memory is output from holding circuit 14a at timing signal 331, indicated along data output timing signal axis 330 to the interleave circuits of demultiplexer 15a. During frame (N), the data from frame (N) are stored in the second FIFO memory of the holding circuits after generation of the timing signal 331, and are held until generation of the next output timing signal 332, and so on. If a data transmission format in the digital broadcasting adopts a frame structure of a fixed length, such as shown in FIG. 3, for example, a time interval 340 between a synchronization signal of an arbitrary frame and a synchronization signal of a next frame is basically constant at a reception side.

In the case where the synchronization signal is normally detected, the timing signal output circuit 122 outputs the timing signal to the corresponding data holding circuit after a constant period 340 has elapsed. The constant period 340 is specifically equivalent to a period obtained by subtracting a time (period) of a synchronization signal from a time (period) of one frame. Further, since the synchronization signal detection circuit 121 carries out the detection of the synchronization signals of the respective reception bands individually, the timing signals, e.g., 331, 332, are outputted to the corresponding data holding circuits 14a to 14c for the respective reception systems. Consequently, each of the data holding circuits 14a to 14c outputs the data of one frame stored in the internal FIFO memories to the corresponding de-interleave circuits 15a to 15c in synchronization with the supplied timing signal, as described above.

An exception to the process described above occurs in the case when a synchronization signal could not be received because of data error. The operation in the case where this device cannot detect a synchronization signal in reception signals is described below. Incidentally, the description will be made on the assumption that the data input changeover circuit 16 already selects an arbitrary reception system.

The respective reception systems of the device shown in FIG. 2 always operate. The system control circuit 18 acquires signal levels, signal error rates and the like of the respective reception systems as evaluation parameters of reception states of the respective bands. Further, the system control circuit 18 controls the data input changeover (selection) circuit 16 so that reception system of the reception band having the best reception state is selected on the basis of the acquired evaluation parameters.

As described above, since the synchronization signal detection circuit 121 always attempts to detect the respective synchronization signals of the systems which are selected and not selected by the data input changeover circuit 16, the detection results as to all of the synchronization signals of the respective reception bands are also supplied to the relative synchronization recognition circuit 123.

Each time when the synchronization signals of the respective reception systems (e.g., first, second and third) are detected, the relative synchronization recognition circuit 123 respectively stores the times when the synchronization signals are respectively detected. Particularly, T1 (relating to the first system), T2 (relating to the second system), and T3 (relating to the third system) are stored.

Further, the relative synchronization recognition circuit 123 receives also information as to which reception system is presently selected by the changeover circuit 16 from the system control circuit 18.

On the basis of the above information, the relative synchronization recognition circuit 123 obtains a relative relation between a reference reception system and the other reception systems. That is, relative relations between timing when the synchronization signal is detected as the reference and timing when the synchronization signal is detected in the other reception system are obtained. These relative relations are stored as relative values in the form of, for example, a matrix as shown in a Table I:

TABLE I

| Relative System | Reference System | | |
|---|---|---|---|
| | First System | Second System | Third System |
| First System | | $\Delta T12$ | $\Delta T13$ |
| Second System | $\Delta T21$ | | $\Delta T23$ |
| Third System | $\Delta T31$ | $\Delta T32$ | |

In Table I, $\Delta Tmn$ (m and are respectively natural numbers) designates a relative time difference as to a reception system m in the case where a reception system is made a reference. For example, $\Delta T21$ designates a relative time difference between a synchronization signal detection point T2 of the second system and a synchronization signal detection point T1 of the first system as a reference.

Figure 4:
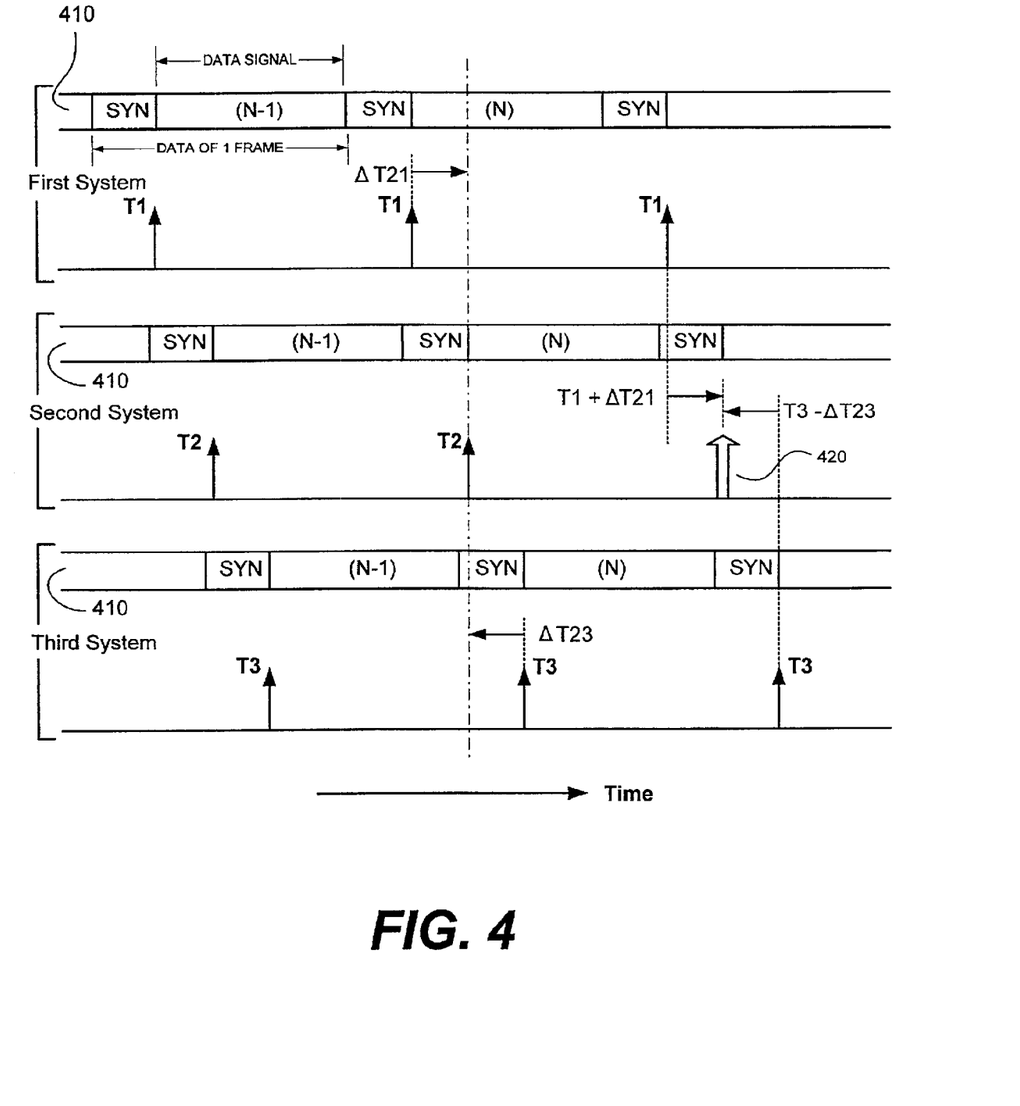
FIG. 4 is a matrix table and time chart illustrative of exemplary relative time differences of synchronization signal detection times in respective reception systems.

With reference to FIG. 4, it is assumed that the reception state presently selected by the data input changeover circuit 16 is the second reception system. As shown in the timing chart of FIG. 4, from the transmission data 410 the detection timing of a synchronization signal of the second reception system is expressed by $(T1+\Delta T21)$, where the reference is the first reception system.

On the other hand, in the case where the reference is the third reception system, the detection timing of a synchronization signal of the second reception system is expressed by $(T3-\Delta T23)$, where T3 is the synchronization signal detection point of the third system.

Accordingly, in the case where a next synchronization signal of the reception system selected by the changeover circuit 16 cannot be detected, the relative synchronization recognition circuit 123 can compensate the next signal of the selected system by using the detection timing of a synchronization signal obtained from another reception system.

This will be described using an example in which the second reception system shown in FIG. 4 could not obtain a synchronization signal, for example, as a result of electric wave failure. White arrow 420 indicates the synchronization signal that could not be obtained.

That is, though a time of one frame has passed after detection of a synchronization signal, in the case where a synchronization signal of the second reception system is not detected, the relative synchronization recognition circuit 123 may presume a detection point of the synchronization signal of the second reception system by using the detection result of a synchronization signal in another reception system. Specifically, as shown in the time chart of FIG. 4, it is possible to presume that the synchronization signal was detected in the second reception system at the point of $(T3-\Delta T23)$. Although this is an example in which the detection result of the third reception system is used as a comparison reference, if the detection result of the first reception system is used, it is also possible to presume that the detection point is $(T1+\Delta T21)$.

Next, after a predetermined period has passed from the presumed detection time, the relative synchronization recognition circuit 123 issues an instruction to the timing signal output circuit 122. This predetermined period is specifically equivalent to a period obtained by subtracting a time length of a synchronization signal from a time length of one frame, as shown by interval 340 in FIG. 3. Receiving this instruction, the timing signal output circuit 122 outputs a timing signal to the data holding circuit 14b corresponding to the second reception system. Receiving this timing signal, the data holding circuit 14b outputs data held in the holding circuit.

Accordingly, even in the case where a synchronization signal in a reception signal frame of the second reception system could not be detected, the reception data of the frame can be suitably outputted from the data holding circuit 14b to the de-interleave circuit 15b. This is useful as a recovery in the case where a synchronization signal could not be detected because of electric wave failure, as a result of multi-path or noise, for example.

Incidentally, in the above embodiment, although both the first reception system and the third reception system can be used, it is also possible to make definition as to which reception system is given priority and is used. For example, the system control circuit 18 monitors the reception states of the respective reception systems. On the basis of the monitor results, the system control circuit 18 may instruct the relative synchronization recognition circuit 123, for example, to give priority to the one reception system having the best reception state among the other reception systems, to use the one given priority, and/or to presume the detection time of a synchronization signal.

Figure 5:
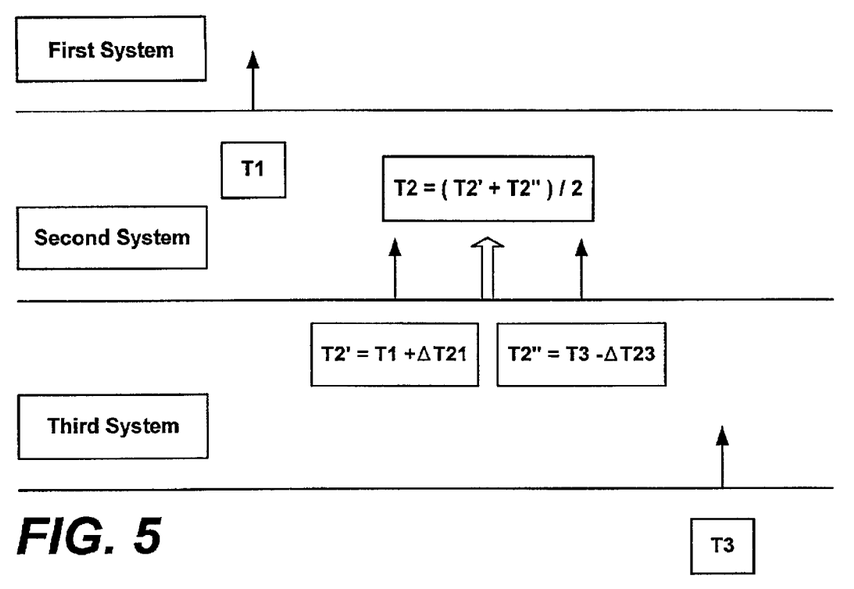
FIG. 5 is a time chart illustrative of an exemplary relation between detection of a synchronization signal included in reception data and generation of a timing signal for decoding reception data in accordance with the present invention.

Moreover, the detection time of a synchronization signal of the system also may be presumed on the basis of an average value of presumed detection times obtained from the other systems. A description will be made on the basis of the foregoing example. As shown in FIG. 5, an average value $(T2'+T2'')/2$ of synchronization signal detection time $T2'=(T1+\Delta T21)$ presumed from the first reception system and synchronization signal detection time $T2''=(T3-\Delta T23)$ presumed from the third system is presumed as detection time T2 of the synchronization signal of the second system.

In the foregoing example, the reference for the presumption is in either reception system where a synchronization signal was detected. A presumed value can be obtained by adding a relative value to a reference value of the reference. Alternatively, it is also possible to make the reference value an average of detection times of the respective reception systems.

Figure 6:
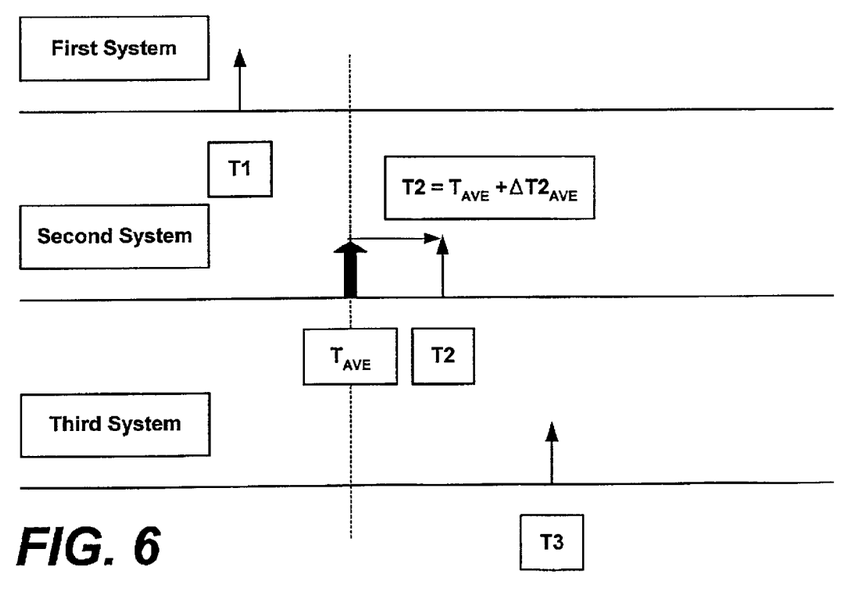
FIG. 6 is a time chart illustrative of an exemplary relation between detection of a synchronization signal included in reception data and its average value in accordance with the present invention.

For example, the relative synchronization recognition circuit 123 first obtains an average value "$T_{AVE}$" of detection times of synchronization signals of all reception systems receiving synchronization signals (see FIG. 6). Then, a difference value "$\Delta T\#_{AVE}$" between the average value $T_{AVE}$ and the respective detection times "T#" of respective synchronization signals of each of the reception systems is obtained. (The "#" shows each number of the systems). This difference value $\Delta T\#_{AVE}$ and the average value $T_{AVE}$ are stored. The timing signal for decoding, which is for this reception system, can be formed on the basis of the average value and the difference value as to the selected reception system.

Figure 7:
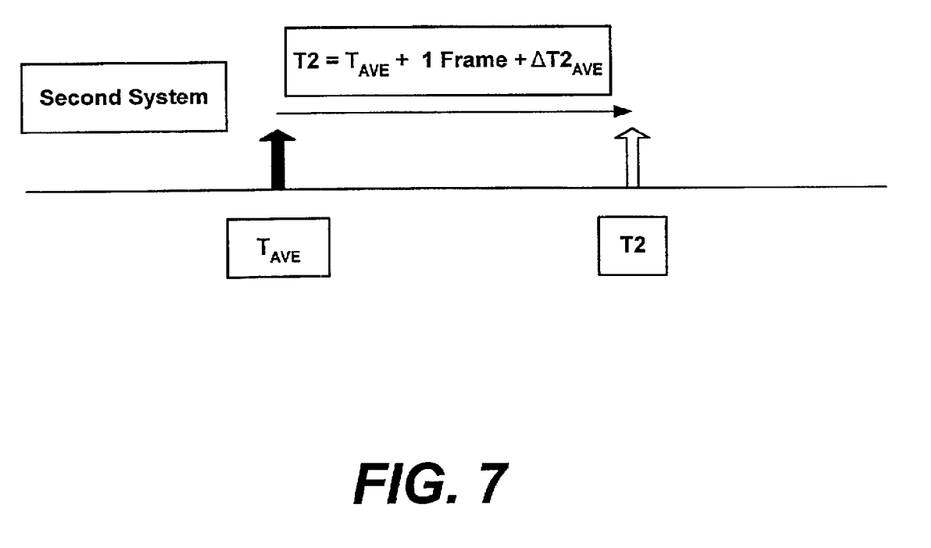
FIG. 7 is a time chart illustrative of an exemplary relation between detection of a synchronization signal included in reception data and generation of a timing signal for decoding reception data in accordance with the present invention.

As shown in FIG. 6, if the second reception system is selected, the difference value "$\Delta T2_{AVE}$" of the second system is stored. As shown in FIG. 7, in the case where a synchronization signal "T2" can not be detected, the stored difference value $\Delta T2_{AVE}$ is added to a value obtained by adding a time length of one frame to the average value $T_{AVE}$ so that it becomes possible to generate the timing signal T2 for decoding that corresponds to the second reception system.

When electric power saving in the whole receiver is taken into consideration, the system control circuit 18 can enable control for stopping all or partial function of the non-selected reception systems in accordance with the electric wave reception state of the selected reception system. For example, the system control circuit 18 can allow driving for at least one of the non-selected reception systems while stopping the drive of another non-selected system. It is also possible that system control circuit 18 allows for driving only the selected system (i.e., stopping drive for all other non-selected systems). With respect to a restart of one or more stopped systems, one exemplary way to return control is to enable a reception/processing function to one or more of the non-selected systems so that detection results of synchronization signals of these reception systems may be used when the reception state of the selected reception system becomes more degraded than a predetermined set level.

In the foregoing embodiments, description has been given of, for example, the case of a digital broadcasting system in which a same program is broadcasted from the plurality of transmission bands. However, as described above, programs of the respective transmission bands may be different from each other if the synchronization signals of the respective transmission bands have a definite relative relation.

It is to be understood that the synchronization signal of the present invention is not limited to the forms described above in the exemplary embodiments, i.e., so-called null symbols. Any signal form may be used as the synchronization signal as long as it corresponds to information that can provide the timing necessary when data is extracted from a reception signal.

It will be apparent to those skilled in the art that various modifications and variations can be made receiver for digital broadcasting of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A receiver for digital broadcasting comprising:
   receiving circuits configured to receive a plurality of digital broadcasting waves at the same time, wherein one of the plurality of digital broadcasting signals being selected for providing output from the receiver, and each digital broadcasting wave including synchronization signals;
   a synchronization detector configured to detect the synchronization signals of the plurality of digital broadcasting waves; and
   circuits configured to estimate an undetected one of the synchronization signals in the selected one of the plurality of digital broadcasting waves according to the synchronization signals detected by the synchronization detector.

2. The receiver according to claim 1, wherein the undetected one of the synchronization signals in the selected one of the plurality of digital broadcasting waves is determined according to previously detected synchronization signals of the plurality of digital broadcasting waves and a presently detected synchronization signal of other one of the plurality of digital broadcasting waves.

3. The receiver according to claim 1, wherein each of the plurality of digital broadcasting waves includes a format comprising a plurality of frames, and each of the plurality of frames includes one of the synchronization signals and one of information data signals.

4. The receiver according to claim 3, further comprising a timing signal generator to decode the information data signals; wherein the timing signal generator generates timing signals according to the synchronization signals detected by the synchronization detector.

5. The receiver according to claim 4, further comprising a data extractor, wherein the data extractor extracts the information data signals according to the timing signals.

6. The receiver according to claim 5, further comprising a data decoder of the information data signals.

7. The receiver according to claim 6, further comprising a selector for selecting the selected one of the plurality of digital broadcasting waves, wherein an output signal of the selector is applied to the data decoder.

8. The receiver according to claim 1, wherein the circuits configured to estimate further comprise a memory, in which a time difference between one of the synchronization signals previously detected in the selected one of the plurality of digital broadcasting waves and one of the synchronization signals previously detected in other one of the plurality of digital broadcasting waves is stored, wherein the circuits estimate the undetected synchronization signal according to the time difference and a presently detected synchronization signal of the other one of the plurality of digital broadcasting waves.

9. The receiver according to claim 8, wherein the time difference is stored as a form of relative time difference between the one of the synchronization signals previously detected in the selected one of the plurality of digital broadcasting waves and the one of the synchronization signals previously detected in other one of the plurality of digital broadcasting waves.

10. The receiver according to claim 1, wherein time differences between one of the synchronization signals previously detected in the selected one of the plurality of digital broadcasting waves and the synchronization signals previously detected in other ones of the plurality of digital broadcasting waves are stored; wherein the circuits estimates the undetected synchronization signal according to the time differences and presently detected synchronization signals of the other ones of the plurality of digital broadcasting waves.

11. The receiver according to claim 10, wherein the time differences are stored as a form of relative time difference between the one of the synchronization signals previously detected in the selected one of the plurality of digital broadcasting waves and each of the synchronization signals previously detected in other ones of the plurality of digital broadcasting waves.

12. The receiver according to claim 1, wherein the circuits configured to estimate further comprise calculating circuits to calculate an average value of synchronization timings previously detected in the plurality of digital broadcasting waves and a time difference from the average value, and the circuits estimate the undetected synchronization signal at least according to the average value and the time difference.

13. A receiver for digital broadcasting comprising:
receiving means for receiving a plurality of digital broadcasting waves at the same time, wherein one of the plurality of digital broadcasting signals being selected for providing output from the receiver, and each broadcasting wave including synchronization signals;
synchronization detector means for detecting the synchronization signals of the plurality of digital broadcasting waves; and
estimate means for estimating an undetected one of the synchronization signals in the selected one of the plurality of digital broadcasting waves according to the synchronization signals detected by the synchronization detector means.

14. The receiver according to claim 13, wherein the estimate means determines the undetected one of the synchronization signals in the selected one of the plurality of digital broadcasting waves based on previously detected synchronization signals of the plurality of digital broadcasting waves and a presently detected synchronization signal of other one of the plurality of digital broadcasting waves.

15. The receiver according to claim 13, wherein each one of the plurality of digital broadcasting waves has a format comprising a plurality of frames, and each of the plurality of frames has at least one of the synchronization signals and one of information data signals.

16. The receiver according to claim 15, further comprising timing signal generator means for generating timing signals according to detected synchronization signals.

17. The receiver according to claim 16, further comprising data extractor means for extracting the information data signals according to the timing signals.

18. The receiver according to claim 17, further comprising data decoder means for decoding the information data signals.

19. The receiver according to claim 18, further comprising selector means for selecting the selected one of the plurality of digital broadcasting waves, wherein an output signal of the selector means is applied to the data decoder means.

20. The receiver according to claim 13, further comprising a memory means, in which a time difference between one of the synchronization signals previously detected in the selected one of the plurality of digital broadcasting waves and one of the synchronization signals previously detected in other one of the plurality of digital broadcasting waves is stored, wherein the estimate means estimates the undetected synchronization signal according to the time difference and a presently detected synchronization signal of the other one of the plurality of digital broadcasting waves.

21. The receiver according to claim 20, wherein the time difference is stored as a form of relative time difference between the one of synchronization signals previously detected in the selected one of the plurality of digital broadcasting waves and the one of the synchronization signals previously detected in other ones of the plurality of digital broadcasting waves.

22. The receiver according to claim 13, wherein time differences between one of the synchronization signals previously detected in the selected one of the plurality of digital broadcasting waves and the synchronization signals previously detected in other ones of the plurality of digital broadcasting waves are stored, and the estimate means estimates the undetected synchronization signal according to the time differences and presently detected synchronization signals of the other ones of the plurality of digital broadcasting waves.

23. The receiver according to claim 22, wherein the time differences are stored as a form of relative time difference between the one of the synchronization signals previously detected in the selected one of the plurality of digital broadcasting waves and each of the synchronization signals previously detected in other ones of the plurality of digital broadcasting waves.

24. The receiver according to claim 13, wherein the estimate means further comprising calculating means for calculating an average value of synchronization timings previously detected in the plurality of digital broadcasting waves and a the time difference from the average value, and the estimate means estimates the undetected synchronization signal according to the average value and the time difference.

25. A method for receiving digital broadcasting, comprising the steps of:
receiving a plurality of digital broadcasting waves at the same time, wherein one of the plurality of digital broadcasting signals being selected for providing output from the receiver, and each broadcasting wave including synchronization signals;
detecting the synchronization signals of the plurality of digital broadcasting waves; and
estimating an undetected synchronization signal in the selected one of the plurality of digital broadcasting waves according to the synchronization signals detected by the detecting step.

26. The method according to claim 25, wherein the estimating step includes estimating the undetected synchronization signal according to previously detected synchronization signals of the plurality of digital broadcasting waves and a presently detected synchronization signal of other one of the plurality of digital broadcasting waves.

27. The method according to claim 25, wherein each of the plurality of digital broadcasting waves includes a format comprising a plurality of frames, and each of the plurality of frames includes one of the synchronization signals and one of information data signals.

28. The method according to claim 27, further comprising a timing signal generating step for decoding the information data signals, wherein the timing signal generating step generates the timing signals according to the synchronization signals detected by the synchronization detector.

29. The method according to claim 28, further comprising a data extracting step for extracting the information data signals according to the timing signals.

30. The method according to claim 29, further comprising a data decoding step for decoding of the information data signals.

31. The method according to claim 30, further comprising a selecting step for selecting the selected one of the plurality of digital broadcasting waves, wherein an output signal resulting from the selecting step is applied to the data decoding step.

32. The method according to claim 25, wherein the estimating step further comprises a memorizing step, in which a time difference between one of the synchronization signals previously detected in the selected one of the plurality of digital broadcasting waves and one of the synchronization signals previously detected in other one of the plurality of digital broadcasting waves is stored, wherein the estimating step estimates the undetected synchronization signal according to the time difference and a presently detected synchronization signal of the other one of the plurality of digital broadcasting waves.

33. The method according to claim 32, wherein the memorizing step stores the time difference as a form of relative time difference between the one of the synchronization signals previously detected in the selected one of the plurality of digital broadcasting waves and the one of the synchronization signals previously detected in other ones of the plurality of digital broadcasting waves.

34. The method according to claim 25, wherein time differences between one of the synchronization signals previously detected in the selected one of the plurality of digital broadcasting waves and the synchronization signals previously detected in other ones of the plurality of digital broadcasting waves are stored, and the estimating step estimates the undetected synchronization signal according to the time differences and presently detected synchronization signals of the other ones of the plurality of digital broadcasting waves.

35. The method according to claim 34, wherein the memorizing step stores the time differences as a form of relative time differences between the one of the synchronization signal previously detected in the selected one of the plurality of digital broadcasting waves and each of the synchronization signals previously detected in other ones of the plurality of digital broadcasting waves.

36. The method according to claim 25, wherein the estimating step further comprising calculating an average value of synchronization timings previously detected in the plurality of digital broadcasting waves and a time differences from the average value, and the estimate step estimates the undetected synchronization signal at least according to the average value and the time difference.

* * * * *